United States Patent [19]

Parker et al.

[11] Patent Number: 5,252,655

[45] Date of Patent: Oct. 12, 1993

[54] DENSIFIED CERAMIC GREEN SHEET AND STACK HAVING CONDUCTORS THEREIN

[75] Inventors: Anthony A. Parker, Pittsburgh; Todd T. Stanzione, Sarver; George H. Armstrong, New Kensington; Frankie E. Phelps, Apollo; Susanne M. Opalka, Pittsburgh, all of Pa.

[73] Assignee: Aluminum Company of America, Pittsburgh, Pa.

[21] Appl. No.: 851,610

[22] Filed: Mar. 16, 1992

[51] Int. Cl.$^5$ ............................................... C08K 3/22
[52] U.S. Cl. .................................... 524/430; 524/261; 524/262; 524/263; 524/264
[58] Field of Search ............... 524/430, 261, 262, 263, 524/264

[56] References Cited

PUBLICATIONS

P. D. Calvert et al., "Dispersion of Ceramic Particles in Organic Liquids", Matl. Res. Soc. Symp. Proc., vol. 73, pp. 579–584.

*Primary Examiner*—Paul R. Michl
*Assistant Examiner*—Edward Cain
*Attorney, Agent, or Firm*—Alfred D. Lobo; David W. Pearce-Smith

[57] ABSTRACT

When a dispersion of oxide ceramic particles in certain volatile organic solvents is mixed with less than about 2 percent by weight (based on the weight of particles) of an oligomeric polysiloxanol dispersant, and the dispersion allowed to settle, the oligomer provides a multiplicity of OH groups, many of which are available for interactive bonding to the surfaces of the particles. The net result is that the particles settle more slowly; also, the sediment has a density higher than that of sediment from a dispersion of the same particles in the same solvent mixed with the monomeric silane from which the oligomer was formed. Exceptionally dense and strong "tape", for making sintered circuitized multilayered ceramic structures, is produced by capitalizing on this phenomenon. The effectiveness of the oligomer is predicated upon the prehydrolysis of the siloxane, prior to forming the dispersion. In a stable suspension with the binder, the slip viscosity is lowered compared to that of a slip containing no dispersant, or the siloxane monomer as dispersant, at dynamic shear rates in the range of 5–70 sec$^{-1}$. Green cards cut from the tape have greater pull strength, higher Young's modulus, higher stress at break, higher adhesion to each other in a stack, and higher strain at break than green cards made from a slip containing no polysiloxanol oligomer.

20 Claims, 1 Drawing Sheet

DENSIFIED CERAMIC GREEN SHEET AND STACK HAVING CONDUCTORS THEREIN

BACKGROUND OF THE INVENTION

Numerous electronic devices comprise a multilayered ceramic structure referred to as a "stack" between each ceramic layer of which is sandwiched a patterned electrical conductor. Since each layer provides a substrate for a substantially planar circuit, it is also referred to as a 'ceramic circuit substrate'. One or more circuits are typically provided with termination pads for attaching semiconductor chips, connector leads, capacitors, resistors, and the like. Electrical interconnection between circuits in successive layers may be provided through "vias" formed by vertical passages filled with a 'metal paste', typically tungsten oxide, molybdenum oxide, or gold, prior to lamination of individual solid but flexible ceramic sheets (also referred to as "tapes") to form the stack, and before the stack is sintered.

A 'slip' for a green ceramic sheet is typically prepared by mixing several oxide ceramic particles, with or without glass particles (together referred to as "ceramic powder"), a relatively low molecular weight (mol wt) dispersant, a thermoplastic matrix polymer to reinforce the structure of the green sheet, a plasticizer, and enough solvent to allow the slip to be spread (doctored) onto a moving belt. When the solvent is volatilized, a coherent flexible green sheet is formed. This green sheet is cut into cards of chosen sizes, typically less than 1.5 mm thick, and smaller than 0.5 meter×0.5 meter, and fired at a temperature sufficient to drive off the organic components (matrix polymer, plasticizer, dispersant optionally with another steric stabilizer or rheology modifier) and sinter the ceramic particles together into a densified ceramic substrate. At the same time, the metal oxide paste is converted to a sintered dense metal which has the requisite conductivity to provide the desired interconnection.

Since maintaining the conductivity of all circuits is critical to the performance of an electronic device using a stack, especially if the device is to be used over a long period of time in a moisture-containing environment, it will immediately be recognized that the hermeticity of a stack must be maintained.

The problem is that a stack, despite being laminated under pressure, tends to delaminate when it is sintered, for any one or more of a number of different reasons, for example, the rate at which different layers sinter, the different temperatures at which the ceramic sheet and the metal paste are sintered, the difference in thermal expansion coefficients of the ceramic substrate and the metal paste, or the rate at which the polymeric binder is driven off.

It is self-evident that if successive cards in the stack were perfectly hermetically adhered, and the various rates were adjusted so as to provide a compromise of conditions at which the effects of competing stresses were neutralized, no delamination would occur. The problem is to provide as dense a green ceramic sheet as can be cast, which sheet when laminated to form a stack of at least three layers, will not delaminate.

The key to making a high quality stack of high strength, homogeneous sheets, is to have each sheet sufficiently dense, with oxide ceramic particles as nearly perfectly packed as practical, which in turn, depends upon obtaining an excellent dispersion of the particles in the volatile organic solvent(s) used to make a slip from which the tape is formed; and to obtain high density green sheet without vitiating the polymer to particle coupling. Cards cut from the green sheet will then have essentially identical, optimum properties.

One can only obtain maximum green sheet density with maximum sediment density which results in a correspondingly dense cast slip having optimum packing of particles. To obtain optimum packing one must use particles with as narrow a size distribution as possible, allow them to settle slowly out of suspension, and to do so without agglomeration. To prevent agglomeration, the dispersant generates repulsion between adjacent particles. Such repulsion is provided by a mechanism referred to as "charge stabilization". An alternative is to provide "steric stabilization", by which polymers attach to particle surfaces forming "clouds" around the particles. When particles approach each other, the overlap of the polymer cloud provides an osmotic pressure which keeps the particles apart. All the foregoing considerations are known (see "Dispersion of Ceramic Particles in Organic Liquids" by P. D. Calvert, R. R. Lalandham, et al. *Matl. Res. Soc. Symp. Proc.* Vol 73, pg 579, 1986 Materials Research Society).

However, to provide effective steric stabilization, there must be adequate polymer interaction with the particle; and those portions of the polymer chains distally disposed relative to the particles' surfaces must not interfere with the function of the binder (reference to 'binder' typically includes the matrix polymer and a plasticizer which may be present, unless otherwise stated). Since the polymeric binder is necessary to provide a tape, it was evident that it may already provide a degree of steric stabilization which might be beneficial. Therefore it would serve no useful purpose to provide a second polymer which might also provide the same function. Further, the structural interaction of chains of the matrix polymer and such other polymer as might be used for steric stabilization, could not be estimated from a knowledge of the structures of the polymeric binder and other polymer. Nor could it be foreseen what the effect, deleterious or not, of such combination of matrix polymer and other polymer might be on the rheology of the slip to be cast, its morphology, or that of a sintered sheet.

With particular respect to the use of a hydrolyzed siloxane (also referred to as a "prehydrolyzed silane" to emphasize the requirement that the silane be hydrolyzed prior to addition to the dispersion of particles in solvent) which generates a polysiloxanol oligomer (hereafter "oligomer" for brevity), it was not known how strong the affinity of OH groups would be for the oxide ceramic and glass particles used in tape, nor what the interaction of the OH groups would be with the matrix polymer or plasticizer used, even if there was no chemical reaction between the functional groups of the oligomer and those of the matrix polymer and plasticizer. Specifically, it could not be deduced whether the OH groups of the oligomer would be available to the particles, or that they would be available in an amount sufficient to provide effective dispersivity in a slip containing a substantial, though minor amount by weight of binder.

Still further, since a practical tape is made from particles of different oxides, each used in a different range of particle sizes, there is no known method to estimate the dispersive effect of oligomer on the individual particles. For practical reasons, using conventional dispersants, a slip for a card typically contains a major proportion by weight of weight of smaller particles than about 3 μm, there being no difficulty casting a slip of only the large particles. For example, gamma or α-alumina particles in the range from about 3 μm–6 μm may be used with chromia and glass particles in the range from about 1 μm–4 μm. Using a polysiloxanol oligomer as dispersant, a slip may be made and cast from particles smaller than 3 μm, as small as 0.5 μm.

Because it is difficult to form a desirable dispersion of micron-sized particles with steric stabilization, the emphasis to date, has been on charge stabilization which is provided by a dispersant molecule with a "head" function which attaches itself to the ceramic particle, and a "tail" function responsible for generating repulsion. Siloxanes ("silanes"), carboxylic acids and the like are known effective dispersants, the effectiveness of the former deriving from the organofunctional group on the Si atom. The effectiveness of a dispersant is measured by a sediment volume test in which a ceramic powder, polymeric binder, solvent, and dispersant are thoroughly dispersed by milling, then allowed to settle under gravity in a graduated cylinder. The most effective dispersants result in a sediment density of about 50% of theoretical density (of the ceramic oxide).

Of particular interest is that such densification of particles as may occur with prehydrolyzed tetraalkoxysilanes is unsuitable for the purpose at hand. Oligomerization of a tetraalkoxysilane results in a glassy polysiloxane with no organofunctional group to provide better dispersion. Such a polysiloxane would act as a sintering aid during firing.

When densification occurs with a polysiloxanol derived from a trialkoxysilane, it occurs without disruption of the polymer-to-particle coupling only with certain organic solvents, and when a compatible organofunctional group of the silane (to be hydrolyzed) is chosen. Even with the use of solvents with which such densification does occur, there is no recognized scientific principle to support a conclusion that such densification would be carried over to a suspension of the particles in the presence of a relatively large amount of a polymeric binder, necessarily also present, which binder is soluble in the solvent used.

As earlier stated, after a slip is cast it is dried to form the green ceramic tape from which sheets are cut. Such drying is conducted under elevated temperature to volatilize the solvent quickly. Under controlled drying conditions, a large number of the chains of oligomer not attached to the particles of ceramic powder, are condensed through their OH groups to form a polysiloxane polymer.

Not by any means of minor importance is the ability of a first sheet of cast and dried tape to bond to a second sheet of the tape when the two sheets are overlaid, one upon the other, under pressure. Since typically, a small excess of dispersant is used, whether silane or oligomer, the effect of the excess on the bonding of one sheet to another is critical to the formation of an acceptable stack. It could not be deduced from known scientific principles, how excess polysiloxanol chains would migrate through a cast slip, or why they should, and what the effect of their auto-condensation into polysiloxane chains (when the slip is dried) would be on the adhesion of one dried green sheet to another. Moreover, the greater the excess of oligomer used, the greater the amount of polysiloxane formed, and the higher the rigidity of the dried tape. How such rigidity might affect the processability of the tape could not have been predicted, nor could their proclivity, when sintered, to form a stack having hermetically sealed interfaces between successive sheets.

SUMMARY OF THE INVENTION

It has been discovered that when a dispersion of oxide ceramic particles in certain volatile organic solvents is mixed with less than about 2 percent by weight (wt %) of polysiloxanol oligomer (based on the weight of particles) of a di- or trialkoxysilane monomer having a chosen organofunctional group to form a slurry which is allowed to settle, the oligomer provides a multiplicity of OH groups, so many of which are available for interactive bonding to the surfaces of the particles, that the net result is that the particles settle more slowly and the volume of the sediment has a density higher than that of sediment from a dispersion of the same particles in the same solvent mixed with the monomeric silane from which the oligomer was formed. This phenomenon is particularly remarkable because the sediment density with the monomer can be very high, often about 50% of theoretical, so that to obtain an even higher density with the oligomer is exceptional.

It has also been discovered that the disparate effect of the combination of the organofunctional group and the available silicon-bonded OH groups in a polysiloxanol oligomer on different sizes of oxide ceramic and glass particles in the range from about 1 μm–10 μm, and mixtures of particles in that range, results in a sediment volume which is denser than the cumulative densities of sediments of each material using the same amount of polysiloxanol in the same solvent.

It has still further been discovered that when a hydrolyzed organosilane is allowed to form an oligomer with chains having a number average distribution with a number average degree of polymerization in the range above 2 but below that near the gel point, many of which chains have silicon-bonded OH groups, and the oligomer is added to a dispersion of oxide ceramic particles in an organic solvent for a polymeric binder to form a slip to be cast, in an amount sufficient to form a stable suspension of ceramic powder with the polymeric binder, the slip viscosity is lowered compared to that of a slip containing no dispersant, or the siloxane monomer as dispersant, at dynamic shear rates in the range from 5–70 sec$^{-1}$; that the cast slip containing oligomer has better tensile strength than a slip containing the same amount of monomer precursor, the slips being otherwise identical; that green cards containing the oligomer have greater pull strength, higher Young's modulus, higher stress at break, and higher strain at break; that green cards containing the oligomer have higher adhesion to each other in a stack than those containing no oligomer; and, the green cards containing oligomer when stacked and sintered also have fewer defects and greater strength than a stack made with cards from a comparable tape made with the same monomeric (non-oligomeric) silane in the same amount, under essentially the same conditions.

It is therefore a general object of this invention to provide a castable slip of ceramic powder in a suspension of a matrix polymer, with from 0–40% of a plasticizer for the matrix polymer, each incapable of reacting with the organofunctional group of a trialkoxy silane, such matrix polymer being selected from the group consisting of polyvinyl alcohol ("PVA") copolymers, vinyl polymers and polyvinylpyrrolidone copolymers;

in combination with from about 0.02 to about 2 wt %, based on the weight of ceramic particles, of the aforesaid polysiloxanol oligomer; to provide a slip in which the matrix polymer is present in the range from about 2 to 20 wt % of the slip, and in which the order of mixing of the ingredients does not substantially affect the rheology of the slip or the yield behavior, flexibility or ductility; and, to permit the use of a specified excess of the polysiloxanol oligomer (dispersant) chains of which migrate towards the interface of the slip and a synthetic resinous, typically polyester, belt on which the slip is cast, and upon autocondensation during drying at a temperature sufficiently high to evaporate essentially all solvent, produces polysiloxane chains, generated in situ, having relatively fewer OH groups per unit weight of Si—O-containing polymer than those present per unit weight of oligomer. During sintering these polysiloxane chains appear to function as a high temperature adhesive for successive circuitized cards in a stack.

BRIEF DESCRIPTION OF THE DRAWINGS

The foregoing and additional objects and advantages of the invention will best be understood by reference to the following detailed description, accompanied with schematic illustrations of preferred embodiments of the invention, in which illustrations like reference numerals refer to like elements, and in which.

DETAILED DESCRIPTION OF PREFERRED EMBODIMENTS

Figure 1:
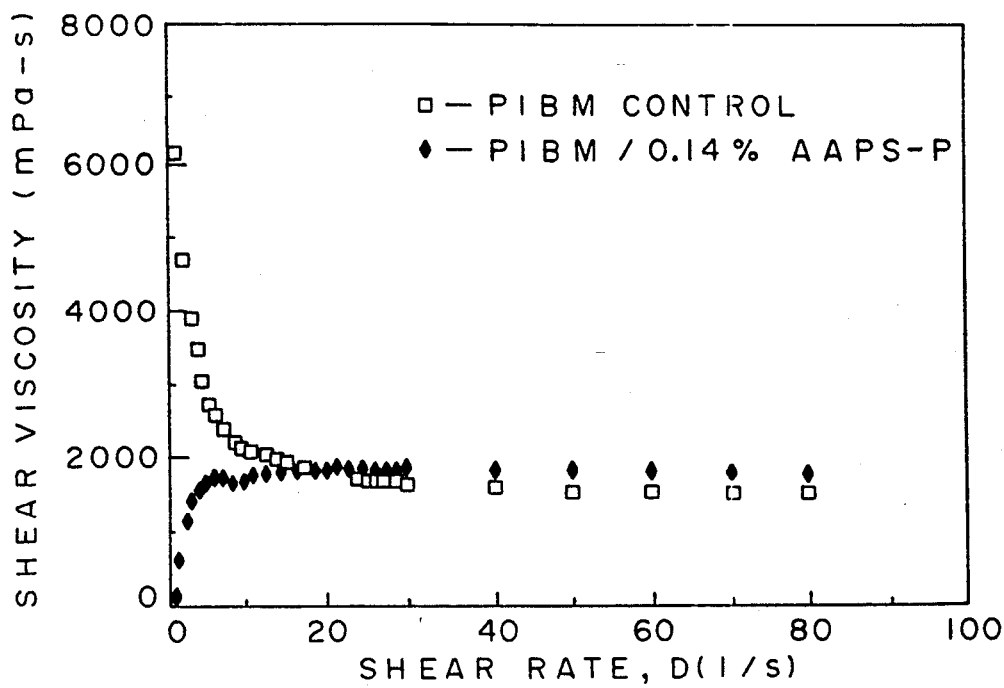
FIG. 1 illustrates the rheological difference in behavior of slurries of α-alumina powder in poly(isobutylmethacrylate) ("PIBM") matrix polymer/butylbenzyl phthalate ("BBP") plasticizer (available as Santicizer-160 from Monsanto), made with and without oligomer as the dispersant.

Aminosilanes are known to undergo autocatalyzed hydrolysis with a proton source (see article titled "Nuclear Magnetic Resonance Studies of the Hydrolysis and Molecular Motion of Aminopropylsilane" by Kang, H. J., Meesiri, W. and Blum, F. D. in Materials Science and Engineering, A126, 1990, 265; and, Comyn, J. Structural Adhesives, Editor—Kinloch, A.J. 1986, 269). Upon hydrolysis the di- or trialkoxysilane silane is at least partially hydrolyzed to yield an alcohol and the corresponding silanol which, in turn, at least partially condenses to form mixtures of oligomers containing siloxane linkages, and having OH groups attached to some of the Si atoms. Such oligomers are thought to have not only generally linear chains, and some cross-linked lattices, but also cage structures formed in solution and on the surfaces of particles to which the oligomer becomes attached.

The condensation, for example, in acidic aqueous media takes place over a period of time, which is controlled so as to ensure that plural silicon-bonded OH groups remain on the majority of the oligomer chains. It is these OH groups which provide sites for at least partial reaction with OH and other groups believed to be present on the surfaces of the metal oxide and glass frit particles. However, for the effectiveness which distinguishes the effect of the oligomer over that of the monomer, as evidenced by the difference in sediment densities, inter alia, such oligomerization must be realized in the absence of the particles.

As will readily be appreciated from a knowledge of conventional condensation polymerization statistics as presented by Flory (see "Principles of Polymer Chemistry" by Paul J. Flory, pg 361–383, Cornell University Press), when a neat silane monomer is used in a concentration in the range from 0.02 to 2% by wt of ceramic powder in a slip, there is essentially no oligomerization because the monomer concentration is too low for a statistically significant chance of condensation polymerization. Hence the necessity for prehydrolysis with controlled oligomerization.

Since maintaining plural OH groups in the oligomer by controlled hydrolysis is of primary interest, the dialkoxysilanes are less suitable for the production of tapes for electronic packages than trialkoxysilanes which are preferred monomers.

The oligomer is prepared by controlled hydrolysis of a trialkoxysilane, or, a mixture of trialkoxysilanes of the formula $R''Si(OR\alpha)_3$ wherein $R''$ represents an organofunctional group, and R, represents a lower $C_1$–$C_4$ alkoxy group, particularly methoxy, ethoxy, isopropoxy and n-butoxy. A mixture of trialkoxysilanes may be used resulting in a mixture of silanetriols, as well as different alcohols. It is preferred to hydrolyze only one of the three alkoxy groups of the trialkoxysilane so as to generate substantially linear chains of oligomer to provide the requisite silicon-bonded OH groups and minimize crosslinking. Hydrolysis to yield a major proportion of the triol results in gelation. Most preferred are chains having a number average distribution with a number average degree of polymerization $X_n$ in the range from about 3 to about 10, most preferably about 5. The approximate mol wt of a molecule (chain) of an oligomer can be calculated from a knowledge of the structure of the monomer. It is such chains which are most preferred to produce substantial enhancement of sediment density. The preferred siloxanol oligomer has at least one OH group per oligomer molecule, and the preferred oligomer is substantially completely both water soluble and soluble in methanol and ethanol. The oligomer is preferably prepared from a trialkoxysilane monomer with an equimolar amount of water, or a slight excess. The greater the excess of water used, the greater the risk of an unacceptably high degree of crosslinking in the oligomer.

In a particular example, 48 parts Z6020 (N-2-aminoethyl-3-aminopropyltrimethoxysilane from Dow Corning), 48 parts methanol and 4 parts water by wt are held for from about 0.25 to 4 hr depending upon the temperature at which the reaction mixture is held. This temperature is maintained in the range from about 20° C. to about 40° C., preferably from about 20° C. to about 30° C., and most preferably at about 25° C. Sufficient trialkoxysilane is hydrolyzed when the initially two phase liquid mixture is converted to a single liquid phase, unless the monomer is miscible from the start, in which case some other means for determining the degree of hydrolysis should be used, such as following the reaction with $Si^{29}$ in solution NMR analysis. The hydrolysis reaction may be allowed to continue until noticeably viscous indicating an oligosiloxane has been formed.

Another silane, namely Z6032 is hydrolyzed at room temperature (20° C.) by mixing 100 parts Z6032, 25 parts water and 5 parts glacial acetic acid catalyst. Still another silane, namely n-octyltriethoxy silane ("NOSi")

(Huls America) is hydrolyzed at room temperature (20° C.) by mixing 48 parts NOSi, 48 parts methanol, 4 parts water and 1 parts glacial acetic acid catalyst.

The hydrolysis of a single molecule of a trialkoxy silane may be represented as:

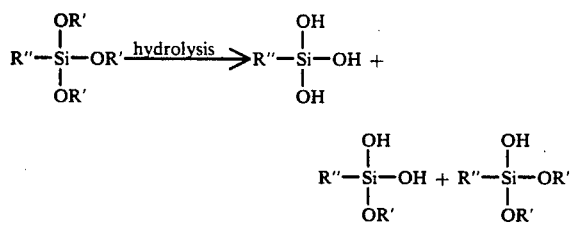

depending upon whether all three, or only two, or only one of the three alkoxy groups is hydrolyzed.

Upon oligomerization, chains having different structures are formed, depending upon the number of OH groups on the individual monomer molecules after hydrolysis. A typical chain has the structure:

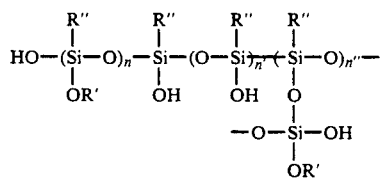

where $n+n'+n''<200$, where $n' \geq 1$ as either a terminal or internal group, and $n''$ is sufficiently small to prevent gelation, so that though some crosslinking probably occurs, the degree to which this occurs is believed to be relatively slight.

In addition smaller chains may be formed having one or more OH groups but as few as two repeating units, and some single molecules with at least one OH group may survive, depending upon the conditions of hydrolysis. Some molecules may have no OH groups remaining, as for example when two monohydroxy silanol molecules condense as follows:

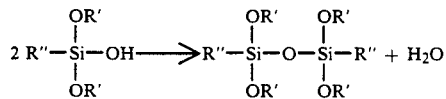

It will be appreciated that there is no known method for determining the exact structure of the oligomers since a distribution of the oligomers is actually formed by hydrolysis of trialkoxy silanes, though excellent work has been done to attempt to do so. See "Structure of Polymer Network Formed by Silane Coupling Agent on Aluminum Oxide Surface" by C. S. Paik Sung and S. H. Lee, paper presented at Anaheim meeting of Div. of Polym. Chem., Inc. ACS Volume 19, No 1 (1978).

The choice of the organofunctional group R" of a silane used depends upon the matrix polymer and plasticizer used, and to a lesser extent upon the particular oxide particles used. The organofunctional group R" may be vinyl, $C_6$-$C_{20}$ alkyl such as n-octyl silane or haloalkyl such as chloropropyl; epoxy such as Z6040; methacrylate such as Z6030; a primary $C_3$-$C_8$ amine such as A100 (Union Carbide); a $C_4$-$C_{10}$ diamine such as Z6020; mercapto $C_2$-$C_8$ alkyl; and cationic styryl such as Z6032. Most preferred is an aminofunctional group having the formula $R^1(NHCH_2CH_2)_aNHR^2$ wherein $R^1$ is a divalent hydrocarbyl group such as alkylene exemplified by —, —$CH_2$—, —$CH_2CH_2$—, —$CH_2CH_2CH_2$—, —$CH_2CH_2(CH_3)CH_2$— and —$(CH_2)_4$—; or alkylenearylene such as —$(CH_2)_2(C_6H_4)$—

$R^2$ is a monovalent hydrocarbyl group or H; and, wherein 'a' is an integer in the range from 0 to 3. The viscosity of the hydrolyzed siloxane (oligomer) at 25° C. may range from 5 to $10^6$ centistokes, preferably from 100 to 10,000 centistokes.

Only enough oligomer to cover the surfaces of the particles will provide the desired enhanced sediment density. This amount will generally range from about 0.1 to about 0.5 wt % of the powder, typically about 0.2%, though as little as 0.02 wt % will show a noticeable improvement in sediment density, and up to 1.5 wt % may be used to ensure coverage. The exact amount needed will depend on the number of reactive surface sites, surface area and hence powder type. To determine the effect of the oligomer on the density of sediment of only alumina particles having a mean diameter of 5.03 $\mu$m, from an isopropanol (IPA) slurry the following experiments were conducted:

A 70% by wt slurry of inorganics (alumina powder) (volume of the slurry is 1 liter) in IPA is ball milled for 12 hr in premixed vehicles with and without the use of oligomer (dispersant) at a level of 0.15% by wt powder. In all cases the slip made is a doctorable and castable slip having properties suitable for continuous casting on a moving belt. The vehicle contains binder in 24% IPA, the binder (6%) used being PIBM plasticized with butylbenzylphthalate (BBP) at 32 phr (parts per hundred parts PIBM). The shear viscosities of the slurries were measured (prior to casting onto a polyethylene terephthalate, PET substrate) with a Haake viscometer using an MV-I inner cylinder type of sensor at shear rates ranging from 0.5 to 80 sec$^{-1}$.

Referring to FIG. 1 there is illustrated the rheological difference between slurries made with a conventional matrix polymer and plasticizer (PIBM/BBP), with and without oligomer. The slurry without oligomer is a thick paste which exhibits extreme shear thinning presumably due to shear induced disintegration of flocculated particles. The slurry with oligomer is less flocculated based on the shape of the curve which shows that it more closely approaches Newtonian behavior within the working shear rate region of the MV-I sensor. The presence of floc structures leads to a less dense sediment.

The following Table 1 sets forth the measured densities of sediments of slurries of the alumina powder (43 wt % solids in the slurry) in combination with different vehicles. Samples were settled at 25° C. in 10 ml graduated cylinders by using pre-weighed aliquots of shaker-bath mixed slurries. For settling experiments, the vehicle is PIBM/BBP used at 2.6 wt % of the solvent. The measured density is written as percent of theoretical density (% theor. dens.) of $Al_2O_3$ (3.98 g/cm$^3$).

TABLE 1

| Sediment densities of Slurries (43% Solids) | | |
|---|---|---|
| Slurry with $Al_2O_3$ powder & | Settling Time (hr) | % Theor. Dens. |
| IPA only | 1 | 36 |
| IPA + PIBM | 10 | 37 |
| IPA + BBP | 10 | 38 |

TABLE 1-continued

Sediment densities of Slurries (43% Solids)

| Slurry with Al$_2$O$_3$ powder & | Settling Time (hr) | % Theor. Dens. |
|---|---|---|
| IPA + PIBM + BBP | 10 | 36 |
| IPA + monomer Z-6020 | 15 | 47 |
| IPA + Z-6020 oligomer | 48 | 50 |
| IPA + PIBM + BBP + oligomer | 48 | 52 |

Equilibrium settled density is typically reached within about 24 hr. The % theoretical density is computed as follows:
(% solids)(slurry weight)/(sediment volume)(dens)
density of Al$_2$O$_3$ is 3.98 g/cm$^3$
density of Cr$_2$O$_3$ is 5.2 g/cm$^3$
density of glass is 2.2 g/cm$^3$ The sediment densities of slurries with PIBM/BBP, whether in combination or separately, are no better than those obtained in neat IPA. This indicates that the PIBM homopolymer and the BBP have no greater affinity for the surfaces of the particles than the solvent itself. In contrast, the densities of the sediment with the oligomer as dispersant is 50% and this high density is improved by the addition of the PIBM/BBP.

The settling times are given because they provide evidence of the significance of the apparently slight difference in density between the sediments obtained with monomer and oligomer. As is well known, the slower the settling time, the higher the density. The large difference in settling times is evidence that the apparently slight difference in sediment density is significant. The density of the cast tape increased from 1.74 g/cm$^3$ to 1.99 g/cm$^3$ when the slurry was dispersed with the oligomer. As a result of the ball milling, the particle mean diameter was decreased to 4.54 μm but the particle distribution remained unchanged.

In general, neither the matrix polymer nor the plasticizer typically used for making a slip for the specific purpose at hand, has a significant affinity for the surfaces of the oxide or glass particles used in the slip. This is generally true for each of the matrix polymers referred to hereinabove, and for the commonly used plasticizers selected from alkyl esters of dialkyl and diaryl acids, such as phthalates, adipates, azelates, etc. for example, an aralkyl phthalate such as BBP (Santicizer-160 from Monsanto); a low mol wt polyethylene/polypropylene glycol such as UCON, 50HV-2000 (from Union Carbide); and an aliphatic diester such as Citroflex-4 (from Monsanto).

It will now be appreciated that when the oligomer to be used has an organofunctional group which is chemically reactive with a functional group on either the matrix polymer or the plasticizer, the characteristics of the dispersion obtained will be wholly different from those of a dispersion where there is no such reactivity. For example a matrix polymer with a ring-openable oxirane group will react with the primary amine group of Z6020 and such reactions will produce a tape which is outside the subject matter of this invention.

With the same oligomer, used in the same amount on any specific powder of a single oxide or glass particle, or a powder of mixtures of such particles, the choice of solvent used in a slip will also have a substantial effect on the sediment density and equilibrium settling time. This variation in sediment densities and settling times is illustrated by the data set forth in the following Table 2 for slurries of alumina particles having a mean diameter of 5.4 μm present in an amount of 25 wt % of the slurry. The 1.3 wt % (based on the wt of alumina particles) concentration of the dispersant used in the slurries is relatively high to ensure good coverage, whether the monomer used was Z6020, or the oligomer (the oligomer of Z6020 was obtained as described above).

TABLE 2

Sediment Densities of Slurries of Al$_2$O$_3$ powder

| Solvent | Dispersant | Conc. % by wt | Settling Time hr | Sed. Dens. % theor. |
|---|---|---|---|---|
| Tol./eth.▲ (55/45) | none | 0 | 1 | 40 |
| Tol./eth. (55/45) | monomer | 1.3 | 15 | 50 |
| Tol./eth. (55/45) | oligomer | 1.3 | 41 | 54 |
| Tol./eth.* (55/45) | oligomer | 1.3 | 48 | 61 |
| Toluene | none | 0 | 4 | 16 |
| Toluene | oligomer | 1.3 | 4 | 18 |
| Ethanol | none | 0 | 16 | 44 |
| Ethanol | oligomer | 1.3 | 24 | 55 |
| Isopropyl alcohol | none | 0 | 4 | 36 |
| Isopropyl alcohol | oligomer | 1.3 | 48 | 53 | reagent grade ethanol; *slurry contains 43 wt % solids

▲ reagent grade ethanol; *slurry contains 43 wt % solids

As will be evident, the increase in theoretical density due to the oligomer, in slurries with toluene is slight, but in a mixture of toluene/ethanol (55/45) or in ethanol alone, the effect of the oligomer is great, particularly if the slurry has a solids content higher than 25 wt % solids. The fast settling time with toluene and the relatively slow settling time with ethanol indicates that ethanol has a significant interaction with the surfaces of the particles, and this interaction is enhanced when the oligomer is present. The choice of solvent is made not only with respect to the interaction of the various particles with it, but also with respect to the ease with which the solvent can be driven off from the slip under continuous casting conditions, at a temperature in the range from about 50° C. to 150° C. so that less than 1% by wt of the solvent remains in green sheets to be stabilized.

With a different silane, namely n-octylsilane (NOSi), and its oligomer, the results with toluene and ethanol, and mixtures thereof, are different from those obtained with Z6020. In the following data for slurries of the same alumina powder as used in Table 2 above, made with 25 wt % solids, but using a smaller but more than sufficient concentration (0.67 wt % of the alumina powder) of silane, whether monomer or oligomer, to cover the surfaces of the particles, than that used in Table 2, only the densities of the sediments are set forth but not the times because they were longer than required for equilibrium settling in all cases.

TABLE 3

Sediment Densities of Al$_2$O$_3$ powder with NOSi

| Solvent | Dispersant | Conc. % by wt | Sediment Dens. % theor. |
|---|---|---|---|
| Toluene | none | 0 | 16 |
| Toluene | monomer | 0.67 | 20 |
| Toluene | oligomer | 0.67 | 45 |
| Tol./eth. (80/20) | none | 0 | 41 |
| Tol./eth. (80/20) | oligomer | 0.67 | 41 |
| Tol./eth. (50/50) | none | 0 | 38 |
| Tol./eth. (50/50) | oligomer | 0.67 | 45 |
| Tol./eth. (20/80) | none | 0 | 38 |
| Tol./eth. (20/80) | oligomer | 0.67 | 40 |
| Ethanol | none | 0 | 38 |
| Ethanol | oligomer | 0.67 | 40 |

For ethanol as the solvent, there is little difference between the sediment densities with and without oligomer because it provides much better wetting of the particles than toluene. The sediment densities with oligomer as the dispersant for any particular solvent or mixture, do not vary significantly as long as the oligomer is prehydrolyzed, though this would not have been noticed with ethanol and NOSi in the above examples. Such oligomerization as may occur when the monomer is used is ineffective to provide significant enhancement of sediment density.

Typical ingredients including alumina, chromia and white glass frit, used in representative tapes are set forth in Table 4. All tapes are made with an organic content of 6 wt % in the slip, with the solvents being 23.5 wt % and the remainder 70.5 wt % being inorganic powder.

The sediment densities obtained with specific individual powders were measured for slurries in a 55/45 toluene/ethanol solvent containing 43 wt % solids, made without a dispersant, and the same solids with 0.66 wt % oligomer of Z6020 (indicated by an asterisk in the Table 4 below). The size range of the alumina is about 3 $\mu$m-8 $\mu$m; the chromia is about 1 $\mu$m-5 $\mu$m; and the white glass frit is about 1 $\mu$m-5 $\mu$m. The measured sediment densities at equilibrium, the time to equilibrium, the theoretical proportionately weighted (for the ratio of the individual constituents) sum of the densities, and the improvement attributable to the silane, are set forth in the following Table 4:

TABLE 4

| Sediment Densities of Different Powders | | | |
|---|---|---|---|
| Sample | Time (days) | Dens. (g/mL) | Theor. Sum (g/Ml) | % Imp. w/oligomer |
| $Cr_2O_3$ | 1 | 0.72 | | |
| $Cr_2O_3$* | 5 | 1.81 | | 151 |
| Glass frit | 30 | 1.13 | | |
| Glass frit* | 30 | 1.49 | | 32 |
| $Al_2O_3$ | 5 | 1.71 | | |
| $Al_2O_3$* | 6 | 2.18 | | 27 |
| $Al_2O_3$/frit 90/10 | 1 | 1.45 | 1.65 | |
| $Al_2O_3$/frit 90/10* | 5 | 2.20 | 2.11 | 52 |
| $Al_2O_3$/frit/$Cr_2O_3$ 90/8/2 | 1 | 1.54 | 1.64 | |
| $Al_2O_3$/frit/$Cr_2O_3$ 90/8/2* | 5 | 2.20 | 2.12 | 43 |

*indicates that oligomer was added

Absolute sediment densities are used to facilitate comparison because the final theoretical density will be complicated by the fact that the particle size distributions are different for each of the three powders. In the case of slurries of powder mixtures without the oligomer, the experimentally measured density is slightly lower than the theoretical proportionately weighted sum. Surprisingly, when the oligomer is added to the same slurries, the measured densities exceed the arithmetically weighted theoretical summations. The chromia benefits the most from the oligomer.

Figure 2:
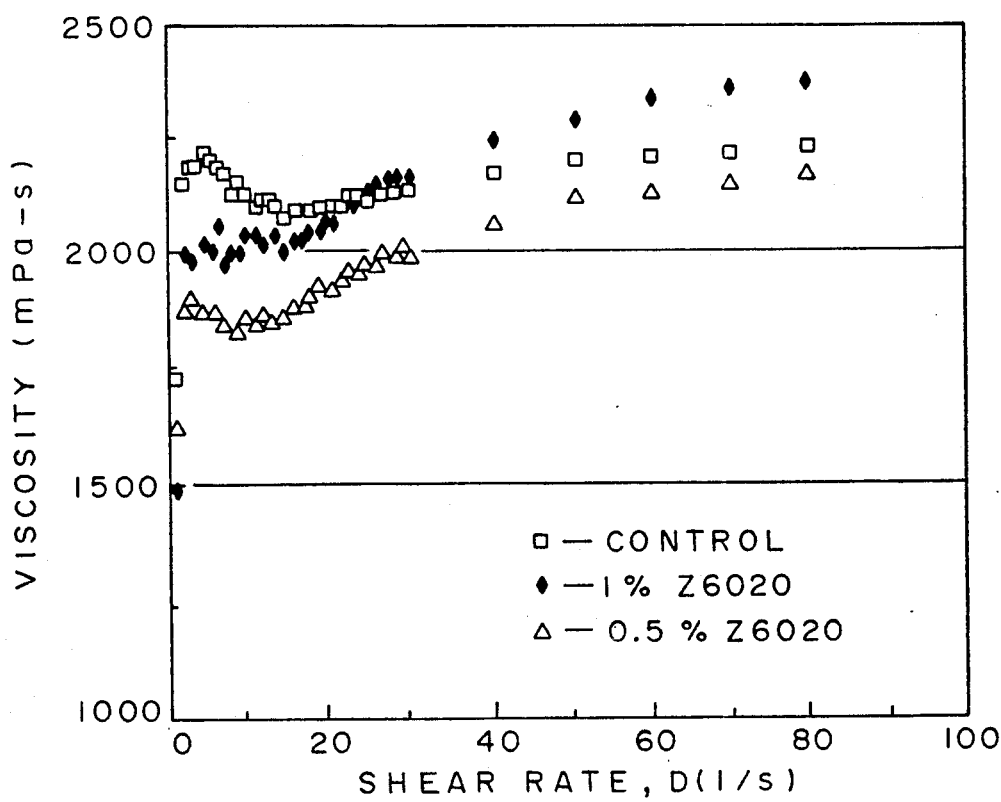
FIG. 2 illustrates the rheological difference in behavior of slurries of alumina and glass frit in polyvinyl alcohol ("PVA")-co-vinyl acetate-co-vinyl butyral ("PVB")/Citroflex (aliphatic diester), made with and without oligomer as the dispersant.

Since slurries in which the particles are homogeneously dispersed, generally yield tapes with higher green densities and with improved tensile properties, the effect of the oligomer on the viscosity of a slurry is measured for a PVB/Citroflex binder containing 70 wt % solids (alumina/glass frit) in 55/45 toluene/ethanol solvent at 25° C. The data for four separate 1 liter test mill trials for each slurry is presented in FIG. 2. Whether at 0.5 wt % or 1.0 wt % oligomer of Z6020, the viscosity is lowered in comparison to the control slurry without oligomer.

The purpose of using the oligomer having an organofunctional group which is unreactive with the binder, is to provide a denser castable slip than one obtained using the monomer from which the oligomer is derived. From such a denser cast and dried slip, a flexible green sheet is obtained which can be manually handled and cut into cards. The cards have substantial tensile strength, adequate to enable them to be bonded one to another so as to form a multilayer or multi-level ceramic laminate, referred to as a "MLC" or stack, through which holes can be punched without leaving a peripheral burr ("chad"), and which stack, upon being fired, results in each sheet being hermetically sealed to another in the stack. It is essential that the matrix polymer be chosen such that the green tape is flexible, the plasticizer serving only to ensure that the matrix polymer is adequately processable. Further, the matrix polymer, plasticizer and surfactants, if latter are used, must be cleanly volatilized when circuitized cards are sintered at a temperature above 1000° C., that is, the binder must leave no objectionable residue.

In all preferred slips for the purpose at hand, all particles are irregularly shaped and a major portion by weight of the ceramic powder consists of larger particles in the size range from about 2 $\mu$m-10 $\mu$m, preferably 3 $\mu$m-6 $\mu$m, and most preferably such larger particles are alumina, zirconium dioxide or glass; the remainder, smaller particles are in the size range from 0.5 $\mu$m-3 $\mu$m, and most preferably are chromia. The glass may be basic or acidic, its composition not being narrowly critical since its primary function is as a flux for the oxide ceramics which, absent the glass, could otherwise only be sintered at very high temperatures. The glass frit is present in a minor proportion by weight, preferably less than 10% of the ceramic powder. Such glass frits include the alumina silicate glasses, lead borate, lead silicate, borosilicate, lead borosilicate, titanium silicate cadmium borate, lead-cadmium borosilicate, zinc borosilicate and sodium-cadmium borosilicate frits, fused silica and silica glass.

The ceramic powder, that is, oxide particles and glass frit, is in the form of a fine powder typically less than 325 mesh (U.S. Standard Series) but the primary particle size of the powder is not narrowly critical. The size range of powder particles for a frit is determined by the end use of the MLC. Commercially available glasses used for glass frit include the following: coarse white and black frit, fine white and black frit, fine colorless frit, typically of an alkaline earth aluminosilicate containing a transition element.

Ceramic powders used include alumina, chromia, aluminum silicate, cordierite, mullite, spinel, forsterite, barium titanate, magnesium silicate, steatite, titanium dioxide, zircon, zirconium dioxide, and the like, and combinations thereof. Most preferred is alumina.

The castable slip of this invention is specific to the desired end product, namely a MLC or stack, and is characterized by having a relatively low amount of matrix polymer, from about 3 to 20% by wt, typically from 5-10% by wt of the slip. To provide a suitable slip with such a high solids content, the choice of matrix polymer is of far greater importance than in other castable slips which have uses other than to form a stack. The relatively low proportion of matrix polymer is essential to provide reproducible shrinkage in dimensionally stabilized sheets cut from the green tape, and minimum interference of the decomposed matrix polymer when a stack of sheets is fired. The importance of dimensional stability of the green sheets and how such stability is attained is set forth in copending patent application Ser. No. 07/701,046, filed May 16, 1991, the disclosure of which is incorporated by reference thereto as if fully set forth herein.

The polymer matrix is typically chosen from a homopolymer of a vinyl aromatic monomer, such as polystyrene; a copolymer of a vinyl aromatic monomer with a mono- or diolefinically unsaturated comonomer, either diblock, triblock or random block, such as poly(styrene-co-acrylonitrile), polystyrene-co-butyl acrylate, ethylene-co-butylene, or poly(acrylonitrile-co-butadiene-co-styrene); a homopolymer of a $C_1$-$C_5$ alkyl acrylate or methacrylate such as poly(isobutylmethacrylate) ("PIBM"), poly(methylmethacrylate) ("PMMA"), poly(n-butyl or isopropyl)methacrylate; a copolymer of polyvinylalcohol ("PVA") such as PVA-co-vinyl acetate, PVA-co-vinyl acetate-co-vinyl butyral ("PVB"), PVA-co-ethylene, PVA-co-PVC-co-vinyl acetate.

The preferred matrix polymers are those having a mol wt in a range such that a doctorable and castable slip is produced which preferably has a shear viscosity in the range from about 1 Pa-sec to about 20 Pa-sec at a dynamic shear rate of 20 $sec^{-1}$.

Referring to Tables 5 and 6, there is set forth the effects of the monomer and oligomer, respectively, on the tensile properties of various samples of green sheet which have 8% by wt organics. Each test result is the average of a statistically significant number of samples, each pulled in a direction perpendicular to the casting direction. Each sample was die-cut as a 'dogbone'; the Instron strain rate was 0.5"/min at 25° C. The higher strengths and Young's moduli realized with the dogbones containing oligomer allow a stack of stabilized cards to be punched cleanly, essentially without chad. The difference between punched cards made with monomer and with oligomer can be visually observed both with the naked eye and under an optical microscope.

TABLE 5

| Sample | Organic phase | Inorganic phase | oligomer |
|---|---|---|---|
| 1 | PVB/Citroflex (3/1) | $Al_2O_3$/white glass (91/9) | 0% Z-6020 |
| 2 | PVB/Citroflex (3/1) | $Al_2O_3$/white glass (91/9) | 0.25% Z-6020 |
| 3 | PVB/Citroflex (3/1) | $Al_2O_3$/white glass (91/9) | 0.5% Z-6020 | above samples made with toluene/ethanol 55/45 solvent

| 4 | PVB/UCON (3/1) | $Al_2O_3$/glass/$Cr_2O_3$ (91/7/2) | 0% Z-6020 |
| 5 | PVB/UCON (3/1) | $Al_2O_3$/glass/$Cr_2O_3$ (91/7/2) | 0.25% Z-6020 | samples 4-5 made with toluene/MIBK/ethanol 65/28/7 solvent

| 6 | PVB/UCON (3/1) | $Al_2O_3$/glass/$Cr_2O_3$ (91/7/2) | 0% Z-6020 |
| 7 | PVB/UCON (3/1) | $Al_2O_3$/glass/$Cr_2O_3$ (91/7/2) | 0.25% Z-6020 |
| 8* | PVB/UCON (3/1) | $Al_2O_3$/glass/$Cr_2O_3$ (91/7/2) | 0.25% Z-6020 |

*contains 0.25% monomer and no oligomer

| 9 | PVB/Citroflex (3/1) | $Al_2O_3$/white glass (91/9) | 0.34% NOSi |
| 10 | PVB/Citroflex (3/1) | $Al_2O_3$/white glass (91/9) | 0.34% Z-6032 |
| 11 | PVB/Citroflex (3/1) | $Al_2O_3$/white glass (91/9) | 0.34% Z-6030 |
| 12 | PVB/Citroflex (3/1) | $Al_2O_3$/white glass (91/9) | 0.34% Z-6040 |
| 19 | PVB/Citroflex (3/1) | $Al_2O_3$/white glass (91/9) | 1% Z-6040 |
| 20 | PVB/Citroflex (3/1) | $Al_2O_3$/white glass (91/9) | .34% Z-6040 | above samples 6-12 made with toluene/ethanol 55/45 solvent

| 13 | PIBM/BBP (3/1) | $Al_2O_3$/white glass (91/9) | 0% Z-6020 |
| 14 | PIBM/BBP (3/1) | $Al_2O_3$/white glass (91/9) | 0.15% Z-6020 |

TABLE 5-continued

| Sample | Organic phase | Inorganic phase | oligomer |
|---|---|---|---|
| 15 | PIBM/BBP (3/1) | $Al_2O_3$/white glass (91/9) | 0.5% Z-6020 |
| 16* | PIBM/BBP (3/1) | $Al_2O_3$/white glass (91/9) | 0.5% Z-6020 |

*contains 0.5% monomer and no oligomer
above samples 13-16 made with isopropanol solvent

| 17 | PS/BBP (3/1) | $Al_2O_3$/white glass (91/9) | 0% NOSi |
| 18 | PS/BBP (3/1) | $Al_2O_3$/white glass (91/9) | 0.17% NOSi | above samples 17-18 made with toluene/ethanol 80/20 solvent

The following Table 6 lists the average Young's Modulus, stress at break, and strain at break. The averages are taken from 8 samples for each numerically identified sample which contains either monomer (marked with *) or oligomer, or neither, for comparison.

TABLE 6

| Sample | Young's Mod. E psi ($\times 10^{-3}$) | Young's Mod. E dynes/$cm^2$ | stress at break psi | stress at break dynes/$cm^2$ | % strain break |
|---|---|---|---|---|---|
| 1 | 9 | 6.2 $\times 10^2$ | 150 | 103 $\times 10^5$ | 13 |
| 2 | 8 | 5.5 $\times 10^2$ | 250 | 172 $\times 10^5$ | 18 |
| 4 | 60 | 41. $\times 10^2$ | 220 | 152 $\times 10^5$ | 5 |
| 5 | 90 | 62. $\times 10^2$ | 570 | 393 $\times 10^5$ | 4 |
| 6 | 23 | 16. $\times 10^2$ | 380 | 262 $\times 10^5$ | 6 |
| 7 | 31 | 21. $\times 10^2$ | 430 | 296 $\times 10^5$ | 9 |
| 8* | 16 | 11. $\times 10^2$ | 390 | 269 $\times 10^5$ | 9 |
| 13 | 15 | 10. $\times 10^2$ | 80 | 55 $\times 10^5$ | 15 |
| 15 | 62 | 43. $\times 10^2$ | 180 | 124 $\times 10^5$ | 8 |
| 16* | 36 | 25. $\times 10^2$ | 130 | 89 $\times 10^5$ | 11 |

The effect of the organofunctional group on the stress at break, and strain at break cannot be predicted from knowledge of the chemical structure of that group, as can be seen from the data set forth below in Table 7 for PVB/Citroflex (3/1). As before, the values set forth are averages for 8 samples, each containing 0.34 wt % oligomer, each pulled perpendicular to case direction, each sample having been die cut C "dogbone", measured at Instron strain rate of 0.5 in/min at 25° C.

TABLE 7

| Sample | Oligomer of | stress at break psi | % strain at break |
|---|---|---|---|
| 1 | none | 150 | 13 |
| 20 | Z-6020 | 320 | 18 |
| 1 | NOSi | 220 | 5 |
| 10 | Z-6032 | 80 | 19 |
| 11 | Z-6030 | 80 | 16 |
| 12 | Z-6040 | 100 | 13 |

Addition of either the monomer or the oligomer decreases the dynamic shear viscosity of the slip compared to its viscosity without either dispersant. The viscosity is reduced the most with the oligomer. The slip with decreased dynamic shear viscosity not only makes it easier to mix the ingredients into a homogeneous slurry, but also to cast a thinner defect-free slip than can be cast with a dispersant-free slip. The decreased dynamic shear viscosity is evident at relatively low as well as relatively high shear rates in the measurements set forth in the following Table 8.

TABLE 8

| Sample No. | organic phase with % oligomer | Shear viscosity Pa-sec ($\times 10^{-3}$) 5 $sec^{-1}$ | 20 $sec^{-1}$ | 70 $sec^{-1}$ |
|---|---|---|---|---|
| 1 | PVB/Citroflex/0% | 2210 | 2090 | 2200 |
| 2 | PVB/Citroflex/0.25% | 1140 | 1150 | 1300 |

TABLE 8-continued

| Sample No. | organic phase with % oligomer | Shear viscosity Pa-sec ($\times 10^{-3}$) | | |
|---|---|---|---|---|
| | | 5 sec$^{-1}$ | 20 sec$^{-1}$ | 70 sec$^{-1}$ |
| 3 | PVB/Citroflex/0.5% | 1870 | 1920 | 2140 |
| 19 | PVB/Citroflex/1.0% | 2010 | 2060 | 2340 |
| 6 | PVB/BBP/0% | 7830 | 12980 | 14190 |
| 7 | PVB/BBP/0.25% | 6730 | 10580 | 11810 |
| 8* | PVB/BBP/0.25% | 7730 | 11510 | 11490 |
| *contains 0.25% monomer, no oligomer | | | | |
| 13 | PIBM/BBP/0% | 2730 | 1870 | 1470 |
| 14 | PIBM/BBP/0.15% | 1640 | 1760 | 1700 |
| 17 | PS/BBP/0% | 1170 | 660 | 480 |
| 18 | PS/BBP/0.15% ▲ | 1030 | 560 | 410 |
| ▲ the oligomer of NOSi | | | | |

Excess oligomer which does not react with the OH groups on the surfaces of particles of the ceramic powder, is attracted to the interface of the slip and the polyester belt. Since the relatively short chains of excess polysiloxanol oligomer are sufficiently mobile to migrate to the interface, they are auotoconcentrated in an interfacial zone between the slip and the belt, so that the slip's lower surface contains at least twice as great a concentration of the oligomer as that in the slip's upper surface. When dried to remove solvent, preferably at a temperature in the range from about 40° C. to about 200° C., and under reduced pressure (vacuum), the relatively short and mobile polysiloxanol chains are autocondensed into relatively long polysiloxane chains which are not as mobile. The concentration of the siloxane groups near the surface of the interface is confirmed by FTIR analysis. Not only is the tensile strength of the green sheet improved due to such autocondensation of oligomer chains, but also the adhesion of one green sheet to another, as measured by the "pull-strength" of test samples with, and without oligomer, which samples have been made by laminating two "coupons" each 2.54 cm $\times$ 2.54 cm, "dull" surface to "shiny" surface.

Since siloxane monomer molecules are less reactive with the OH groups on the surfaces of particles of the ceramic powder, and also more mobile than chains of oligomer, any excess monomer, if present, will also migrate to the casting surface. However, as evidenced by a comparison of samples 7 and 8, and 15 and 16 hereinabove, the mechanical properties, namely Young's modulus and stress at break are both decreased in comparison with those for samples containing the oligomer.

Because the green sheet is typically cast on a moving synthetic resinous belt to which the cast and dried slip does not adhere, the bottom surface (in contact with the belt) of the green sheet acquires a "shiny" surface attributable to the oligomer and binder which has migrated to the surface. In contrast, the upper surface of the green sheet has very little oligomer and appears "dull". Coupons laminated at 190° F., 600 psi and for 15 sec, with either shiny-to-dull, or shiny-to-shiny surfaces in contact, are found to have excellent adhesion; coupons laminated with dull-to-dull surfaces have relatively poor adhesion. Since, in a stack, using shiny-to-shiny surfaces in contact cannot be repeated often without also having shiny-to-dull or dull-to-dull laminations, a stack is preferably made with all cards in shiny-to-dull contact. Therefore the following test results set forth in Table 9 are for shiny-to-dull contact between the coupons. As before, the values set forth are averages for 8 samples, pulled at an Instron strain rate of 0.5 in/min st 25° C.

TABLE 9

| Sample No. | organic phase with % oligomer of | Pull strength ±20% (psi) |
|---|---|---|
| 1 | PVB/Citroflex/0% Z-6020 | 130 |
| 2 | PVB/Citroflex/0.25% Z-6020 | 180 |
| 3 | PVB/Citroflex/0.5% Z-6020 | 200 |
| 4 | PVB/UCON/0% Z-6020 | 90 |
| 5 | PVB/UCON/0.25% Z-6020 | 250 |
| 6 | PVB/BBP/0% Z-6020 | 140 |
| 7 | PVB/BBP/0.25% Z-6020 | 180 |
| 8* | PVB/BBP/0.25% Z-6020 | 240 |
| *contains 0.25% monomer, no oligomer | | |
| 9 | PVB/Citroflex/0.34% NOSi | 60 |
| 10 | PVB/Citroflex/0.34% Z-6032 | 140 |
| 11 | PVB/Citroflex/0.34% Z-6030 | 100 |
| 12 | PVB/Citroflex/0.34% Z-6040 | 100 |

A castable slip typically contains from 60% to 80% by wt of ceramic powder. Alumina is typically the major constituent of a ceramic powder, but any oxide ceramic and any inorganic sinterable material usually characterized as a "glass-ceramic" (or more familiarly, "glass") may be used. Glass-ceramic materials are characterized as devitrified or crystallized forms of glass, the properties of which may vary over a wide range. They are sintered through the controlled, in situ crystallization of a glass body of proper composition brought about by controlled heat-treatment so as to act as a flux for the much higher melting oxide ceramic particles in the ceramic powder. The glass generally includes nucleating agents such as the oxides of titanium zirconium, phosphorus, magnesium, tin and the like. The use of "glass" in a MLC allows it to be tailored to have a coefficient of expansion which closely matches that of alumina, chromia, etc. and the dielectric constants can be tailored to a suitably low value, thereby improving and increasing the speed of the electronic device.

Though the foregoing tests did not include any surfactants such as wetting agents, a commercial formulation of binder would typically contain one or more surfactants. A surfactant helps to wet the surfaces of the ceramic particles by reducing the interfacial tension between the particles and the polymer solution, and helps form a stable suspension of the ceramic powder, therefore a desirably castable slip. By "stable suspension" we refer to one which shows essentially no measurable stratification of densities over a period of at least 12 hr, more preferably, from 3–7 days. The plasticizer in the solution provides flexibility to the green tape and the green cards. Specific binders and plasticizers are mentioned hereinabove only because these are currently in use for making green sheet, but any suitable binder may be used provided it has film-forming properties, is non-volatile at the drying temperature of the cast slip, and compatible with the oligomer chosen, and the constituents of the ceramic powder. The general technology for preparing a slip with a suitable binder is old and well known, having been disclosed in U.S. Pat. No. 2,966,719, the disclosure of which is incorporated by reference thereto as if fully set forth herein.

A method for producing a hermetically sealed stack comprises, (a) dispersing a ceramic powder consisting essentially of a major portion by wt of particles in the size range from 3–10 μm and a minor portion by wt of particles in the size range from about 0.5–3 μm in the presence of from 0.05–0.5% by wt of a polysiloxanol oligomer to form a dispersion in an essentially anhydrous volatile solvent; (b) mixing the dispersion with a solution of a matrix polymer and plasticizer for the matrix polymer to produce a stable suspension; (c) casting a doctorable slip of the stable suspension, having a thickness in the range from about 2 mils (0.002 inch) to 100 mils (0.1"), preferably 5 mils (0.005 inch) to 50 mils (0.050"), most preferably 6–12 mils, on a moving, preferably synthetic resinous surface to which the slip's lower surface is removably adhered, the slip having a density in the range from 45–60% of theoretical, and removing the solvent by evaporation to form a green sheet having an interfacial zone containing at least twice as great a concentration of polysiloxane chains generated in situ by condensation of the oligomer, as that in the slip's upper surface; (d) removing the green sheet having less than 1% by wt of the solvent; (e) dividing the green sheet into cards of predetermined dimensions, and stabilizing the cards; (f) depositing, preferably by screen printing, a conductive metal or metal oxide paste onto more than one of the cards to form a circuitized card; (g) stacking from 2 to about 20 circuitized cards coextensively in one to one correspondence to form a stack and subjecting the stack to a pressure sufficient to adhere the cards to each other, while maintaining the integrity of vertically spaced apart circuits (referred to as "metallurgy") in the stack; and, (h) treating the stack in a reducing atmosphere at elevated temperature and for a time sufficient to effect reduction of the paste and decomposition of the polymer matrix and plasticizer, whereby a hermetic seal between contiguous cards is simultaneously effected.

The best embodiment of a MLC of this invention is a hermetically sealed stack produced by the process described immediately hereinabove.

Having thus described the slip, the green tape, the MLC formed, and the mode of carrying out the process it will be understood that no undue restrictions are to be imposed by reason of the specific embodiments illustrated and discussed.

We claim:

1. A castable slip of ceramic powder consisting essentially of a mixture of a major portion by weight of oxide ceramic particles in the size range from 3–10 μm and a minor portion by wt of oxide ceramic particles in the size range from about 0.5–3 μm, in an essentially anhydrous volatile solvent which forms a solution with a matrix polymer and from 0–40% by weight of plasticizer, said matrix polymer and plasticizer being present in a minor proportion by weight of said slip, wherein said matrix polymer is selected from the group consisting of polyvinyl alcohol copolymers, vinyl polymers and polyvinylpyrrolidone copolymers; said solution containing from 0.05–0.5% by weight of a polysiloxanol oligomer of a trialkoxysiloxane monomer having the structure $$R''Si(OR')_3$$

wherein
R' represents a lower $C_1$–$C_4$ alkoxy group selected from the group consisting of methoxy, ethoxy, isopropoxy and n-butoxy; and,
R'' represents an organofunctional group unreactive with said matrix polymer and plasticizer, and selected from the group consisting of vinyl, $C_6$–$C_{20}$ alkyl, haloalkyl, epoxy, methacrylate, a primary $C_3$–$C_8$ amine, a $C_4$–$C_{10}$ diamine, mercapto $C_2$–$C_8$ alkyl; and cationic styryl; and,
wherein said oligomer has chains having a number average distribution with a number average degree of polymerization $X_n$ in the range above 2 but below that near the gel point.

2. The slip of claim 1 wherein said chains have a number average distribution with a number average degree of polymerization $X_n$ in the range from about 3 to about 10.

3. The slip of claim 2 wherein said ceramic powder forms a sediment having a density greater than that of an otherwise identical slip dispersed with said monomer.

4. The slip of claim 3 wherein said sediment density of all oxide ceramic particles which form a sediment, is greater than the sediment density of the sum of the theoretical densities weighted proportionately for each of the densities of ceramic oxides in said mixture.

5. The slip of claim 2 wherein said slip is formed with a stable suspension of ceramic powder, said suspension having a viscosity, at dynamic shear rates in the range from 5–70 $sec^{-1}$, less than that of an otherwise identical suspension dispersed with said monomer.

6. The slip of claim 3 wherein said R'' is selected from the group consisting of vinyl, $C_6$–$C_{20}$ alkyl, haloalkyl, epoxy, methacrylate, a primary $C_3$–$C_8$ amine, a $C_4$–$C_{10}$ diamine, mercapto $C_2$–$C_8$ alkyl; and cationic styryl.

7. The slip of claim 6 wherein said oligomer is present in an amount in the range from about 0.05 to about 2% by weight of said ceramic powder, said matrix polymer is present in an amount in the range from 3 to 15% by weight, and said ceramic powder is present in an amount in the range from 60 to 80% by weight of said slip.

8. The slip of claim 7 wherein said matrix polymer is polyvinyl alcohol ("PVA")-co-vinyl acetate-co-vinyl butyral ("PVB") and said plasticizer is an alkyl ester of a dialkyl or diaryl acid.

9. The slip of claim 8 wherein said oxide ceramic particles are selected from the group consisting of alumina, chromia, aluminum silicate, cordierite, mullite, spinel, forsterite, barium titanate, magnesium silicate, steatite, titanium dioxide, zircon, zirconium dioxide, and combinations thereof.

10. A flexible green card having upper and lower planar surfaces, severed from a green sheet of ceramic powder held together with a binder essentially free of solvent, said powder consisting essentially of particles in the size range from 0.5–10 μm, said binder consisting essentially of from 3 to 20% by weight of a matrix polymer and from 0 to 40% by weight of a plasticizer therefor, each volatilizable at a temperature above 1000° C. without leaving an objectionable residue, said particles being coated with polysiloxane chains having relatively fewer OH groups per unit weight of Si-containing polymer than the number present per unit weight of a polysiloxanol oligomer of a trialkoxysilane monomer, said oligomer has chains having a number average distribution with a number average degree of polymerization $X_n$ in the range above 2 but below that near the gel point, and is used in an amount in the range from 0.05–0.5% by wt of the ceramic powder to disperse it, but in excess of that required to coat the surfaces of said particles, so that polysiloxane chains not reacted with OH groups on the surfaces of said particles, migrate towards said lower surface to generate a shiny surface, said trialkoxysiloxane monomer having the structure $$R''Si(OR')_3$$

wherein

R' represents a lower $C_1$–$C_4$ alkoxy group selected from the group consisting of methoxy, ethoxy, isopropoxy and n-butoxy; and, R" represents an organofunctional group unreactive with said matrix polymer;

and wherein said chains have a number average distribution with a number average degree of polymerization $X_n$ in the range above 2 but below that near the gel point.

11. The flexible green card of claim 10 wherein said R" is selected from the group consisting of vinyl, $C_6$–$C_{20}$ alkyl, haloalkyl, epoxy, methacrylate, a primary $C_3$–$C_8$ amine, a $C_4$–$C_{10}$ diamine, mercapto $C_2$–$C_8$ alkyl, and cationic styryl.

12. The flexible green card of claim 11 wherein said polysiloxane chains are present in an amount in the range from about 0.05 to about 2% by weight of said particles.

13. The flexible green card of claim 12 wherein said chains are present in an amount in the range from about 0.05 to about 2% by weight of said ceramic powder, said matrix polymer is present in an amount in the range from 3 to 15% by weight, and said ceramic powder is present in an amount in the range from 60 to 80% by weight of said slip.

14. The flexible green card of claim 13 wherein said matrix polymer is polyvinyl alcohol ("PVA")-co-vinyl acetate-co-vinyl butyral ("PVB") and said plasticizer is an alkyl ester of a dialkyl or diaryl acid.

15. The flexible green card of claim 14 wherein said oxide ceramic particles are selected from the group consisting of alumina, chromia, aluminum silicate, cordierite, mullite, spinel, forsterite, barium titanate, magnesium silicate, steatite, titanium dioxide, zircon, zirconium dioxide, and combinations thereof.

16. A method for producing a hermetically sealed stack comprising, (a) dispersing a ceramic powder consisting essentially of a major portion by wt of particles in the size range from 3–10 μm and a minor portion by wt of particles in the size range from about 0.5–3 μm in the presence of from 0.05–0.5% by wt of a polysiloxanol oligomer and an essentially anhydrous volatile solvent to form a dispersion, said oligomer being of a trialkoxysiloxane monomer having the structure

R"Si(OR')$_3$ wherein R' represents a lower $C_1$–$C_4$ alkoxy group selected from the group consisting of methoxy, ethoxy, isopropoxy and n-butoxy; and, R" represents an organofunctional group unreactive with said matrix polymer and binder;

wherein said oligomer has chains having a number average distribution with a number average degree of polymerization $X_n$ in the range above 2 but below that near the gel point;

(b) mixing said dispersion with a solution of a matrix polymer and plasticizer to form a stable suspension for use as a doctorable slip;

(c) casting said doctorable slip having a thickness in the range from about 2 mils (0.002 inch) to 100 mils (0.1"), on a moving surface to which said slip's lower surface is removably adhered, said slip having a density in the range from 45–60% of theoretical, and removing said solvent to form a green sheet having an interfacial zone containing at least twice as great a concentration of polysiloxane chains generated in situ by condensation of the oligomer, as that in the slip's upper surface;

(d) removing said green sheet having less than 1% by wt of the solvent;

(e) dividing said green sheet into cards of predetermined dimensions, and stabilizing the cards;

(f) depositing a conductive metal or metal oxide paste onto more than one of the cards to form circuitized cards;

(g) stacking from 2 to about 20 said circuitized cards coextensively in one to one correspondence to form a stack and subjecting the stack to a pressure sufficient to adhere the cards to each other, while maintaining the integrity of vertically spaced apart circuits in said stack; and, (h) treating said stack in a reducing atmosphere at elevated temperature and for a time sufficient to effect reduction of said paste and decomposition of said polymer matrix and plasticizer;

whereby a hermetic seal between contiguous cards is simultaneously effected.

17. The method of claim 16 wherein said chains have a number average distribution with a number average degree of polymerization $X_n$ in the range from about 5 to about 10; and, said ceramic powder forms a sediment having a density greater than that of an otherwise identical slip dispersed with said monomer.

18. The method of claim 17 wherein said oligomer is present in an amount in the range from about 0.05 to about 2% by weight of said ceramic powder, said matrix polymer is present in an amount in the range from 3 to 15% by weight, and said ceramic powder is present in an amount in the range from 60 to 80% by weight of said slip.

19. A multilayered ceramic structure comprising a sintered stack of at least three circuitized green cards each of which has a shiny lower surface and a dull upper surface, the majority of which cards are autogenously bonded under sintering conditions with a shiny surface of one in coextensive pressurized contact with the dull surface of another such that each interface between successive cards is hermetically sealed, each said green card severed from a green sheet of ceramic powder held together with a binder essentially free of solvent, said powder consisting essentially of particles in the size range from 0.5–10 μm, said binder consisting essentially of from 3 to 20% by weight of a matrix polymer and from 0 to 40% by weight of a plasticizer therefor, said binder being volatilizable at a temperature above 1000° C. without leaving an objectionable residue, said particles being coated with polysiloxane chains having relatively fewer OH groups per unit weight than the number present per unit weight of a polysiloxanol oligomer of a trialkoxysilane monomer from which said polysiloxane chains are formed in situ, which chains have a number average distribution with a number average degree of polymerization $X_n$ in the range above 2 but below that near the gel point, and said oligomer is used in an amount in the range from 0.05–0.5% by wt of the ceramic powder to disperse it, but in excess of that required to coat the surfaces of said particles, so that polysiloxanol chains not reacted with OH groups on the surfaces of said particles, are autoconcentrated in an interfacial zone between slip and substrate on which it is cast, so as to be autocondensed to generate a shiny surface, said trialkoxysiloxane monomer having the structure $$R''Si(OR')_3$$

wherein

R′ represents a lower $C_1$–$C_4$ alkoxy group selected from the group consisting of methoxy, ethoxy, isopropoxy and n-butoxy; and, R″ represents an organofunctional group unreactive with said matrix polymer.

20. The multilayered ceramic structure of claim 19 wherein said oxide ceramic particles are selected from the group consisting of alumina, chromia, aluminum silicate, cordierite, mullite, spinel, forsterite, barium titanate, magnesium silicate, steatite, titanium dioxide, zircon, zirconium dioxide, and combinations thereof.

* * * * *